(12) United States Patent
Ritter et al.

(10) Patent No.: US 7,065,140 B1
(45) Date of Patent: Jun. 20, 2006

(54) METHOD AND APPARATUS FOR RECEIVING VIDEO SIGNALS FROM A PLURALITY OF VIDEO CAMERAS

(75) Inventors: David W. Ritter, San Jose, CA (US); Ara Bicakci, San Jose, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/414,307

(22) Filed: Oct. 6, 1999

(51) Int. Cl.
*H04B 1/66* (2006.01)

(52) U.S. Cl. .................. 375/240.25; 375/240.26; 348/211.5; 348/211.11; 348/558; 348/207.1; 348/211.6; 382/233

(58) Field of Classification Search ........... 375/240.26, 375/240.25, 240, 240.01; 348/153, 154, 348/159, 246, 241, 143, 663, 705, 564, 211–214, 348/156, 509, 563, 654, 662, 689, 558, 207.1; 382/233

See application file for complete search history.

(56) References Cited

U.S. PATENT DOCUMENTS

| | | | |
|---|---|---|---|
| 4,167,021 A * | 9/1979 | Holmes ..................... 348/663 |
| 4,191,971 A * | 3/1980 | Dischert et al. ......... 348/211.11 |
| 4,694,327 A | 9/1987 | Demmer et al. ............. 358/19 |
| 5,051,827 A * | 9/1991 | Fairhurst ................... 348/180 |
| 5,150,212 A | 9/1992 | Han ........................... 348/705 |
| 5,436,659 A * | 7/1995 | Vincent ..................... 348/246 |
| 5,553,609 A * | 9/1996 | Chen et al. ................ 600/301 |
| 5,870,139 A * | 2/1999 | Cooper et al. ............. 348/159 |
| 5,982,418 A * | 11/1999 | Ely ............................. 348/153 |
| 6,124,882 A * | 9/2000 | Voois et al. ................. 348/15 |
| 6,208,376 B1 * | 3/2001 | Tanaka et al. ............. 348/153 |
| 6,549,243 B1 * | 4/2003 | Takashimizu et al. ...... 348/558 |

FOREIGN PATENT DOCUMENTS

JP          11032326 A  *   2/1999

* cited by examiner

*Primary Examiner*—Shawn S. An
(74) *Attorney, Agent, or Firm*—Haverstock & Owens LLP

(57) ABSTRACT

A method and apparatus for receiving video signals from a plurality of video cameras, such as in a video surveillance system. The video cameras are each coupled to provide a video signal to a respective input of a multiplexer. The multiplexer routes a selected one of the video signals to a video decoder. The video decoder receives the selected video signal and is conditioned according to the video signal. This includes synchronizing the video decoder to a frequency and phase of the video signal, controlling a gain level for the video signal and adjusting a dc clamping level for dc restoration of the video signal. Parameters representative of each of these quantities are stored in association with the identity of the corresponding video camera. The video decoder also places each video signal into a format suitable for storage in a storage device and for display by a display device. As the multiplexer is utilized to cycle through the cameras according to a sequence, the parameters for each camera are retrieved and utilized to initialize the video decoder for decoding the video signal received from the corresponding camera. As a result, the amount of time required to condition the video decoder according to the video signal received from each camera is significantly reduced. Accordingly, the present invention allows a surveillance system to cycle through a plurality of cameras in less time than prior systems having a single decoder, but without higher costs associated with prior systems which employ multiple video decoders.

16 Claims, 4 Drawing Sheets

METHOD AND APPARATUS FOR RECEIVING VIDEO SIGNALS FROM A PLURALITY OF VIDEO CAMERAS

FIELD OF THE INVENTION

The present invention relates to the field of receiving video signals from a plurality of video cameras. More particularly, the present invention relates to the field of rapidly synchronizing an apparatus for sequentially receiving video signals from each of a plurality of video cameras.

BACKGROUND OF THE INVENTION

A video camera typically forms an analog composite video signal which is representative of a moving optical image received by the camera. To form the video signal, a sensing spot moves across an image area according to a series of horizontal scan lines arranged from the top of the image area to the bottom of the image area. A complete scan of the image area represented by the video signal is referred to as a "frame." When the bottom of the image area is reached, the process begins again at the top thereby forming a series of frames. National Television Standards Committee (NTSC) and Phase Alternate Line (PAL) are two widely utilized standards for composite video signals.

A composite video signal generally includes a luminance component signal and a chrominance (also referred to as "chroma") component signal. The luminance component signal contains brightness information for the image. Synchronizing pulses included during horizontal and vertical blanking intervals of the luminance component signal synchronize a video decoder to the luminance signal. This allows the video decoder to distinguish each horizontal scan line and to identify the start of each frame. To form the composite video signal, the chrominance component signal is modulated by a high frequency subcarrier and is superimposed over the luminance component signal. A "color burst," which is a series of eight cycles at the subcarrier frequency, appears in blanking intervals for synchronizing the video decoder to the chrominance component signal. The chrominance component signal contains color information for the image.

A composite video signal formed by a video camera can be communicated to a location remote from the camera where it is received by a video decoder and utilized for further processing, such as for storage and/or display. To form an image for display, an illumination spot is scanned across a display area according to a series of horizontal scan lines arranged from the top of the display area to the bottom. So that images from the composite video signal are appropriately processed, the video decoder must be appropriately conditioned according to the composite video signal. For example, the decoder must be synchronized to the phase and frequency of the luminance and chrominance signals and must appropriately control gain applied to each. In addition, dc restoration must be performed by clamping the signals to appropriate reference levels.

A finite amount of time is required to appropriately condition the video decoder according to a received video signal. Before the video decoder becomes stabilized, it first locks onto synchronization pulses of the video signal, thereby aligning itself horizontally and vertically with received video signal. Then, the video decoder locks onto the chrominance subcarrier, performs dc restoration and adjusts gain levels. Because each of these steps must be performed before the next, this process of conditioning the video decoder is time consuming. Typically, several frames are received by a video decoder before the decoder is conditioned according to the video signal. Additional time can be required prior to displaying or storing a frame while waiting for the start of the frame to occur.

Under certain circumstances, it is desired to receive video signals from a plurality of video cameras positioned at remote locations and to process the video signals at a central location. For example, a video surveillance system typically includes a plurality of video cameras placed at strategic locations of a site under surveillance. Typical sites include dwellings, such as homes and apartment buildings, and commercial or governmental sites, such as manufacturing facilities, banks, museums, offices and retail stores. The video cameras can be placed so as to observe activities occurring in driveways, in parking lots, near doorways, in hallways, at cash registers, in stockrooms, at loading docks and in aisles. The central location can be a security desk where displays are monitored by security personnel and where video images are stored or can more simply be a storage device located in a utility room from which video images can be retrieved, should the need arise.

FIG. 1 illustrates a schematic block diagram of a video surveillance system 100 of the prior art. A plurality of (n) video cameras 102, 104 and 106 are positioned at various locations and each is coupled to provide a video signal to a respective input of a multiplexer 108. A select input of the multiplexer 108 conditions the multiplexer 108 to route a selected one of the video signals from the cameras 102–106 to an output of the multiplexer 108. The video signals formed by each camera 102–106 typically vary from each other in frequency (i.e. horizontal line rate, chrominance subcarrier frequency), phase (i.e. relative position of the beginning of lines and frames, phase of the chrominance subcarrier), amplitude (i.e. peak to peak luminance amplitude, chrominance subcarrier amplitude) and dc offset.

An output of the multiplexer 108 is coupled to a video decoder 110. The video decoder 110 receives a selected video signal from the multiplexer 108, synchronizes its internal circuits to the video signal, controls gain levels, performs dc restoration on the video signal and places the video signal into a format suitable for storage in a storage device 112 and for display by a display device 114. The multiplexer 108 is typically utilized to cycle through the cameras 102–106 in a sequence such that at least one complete frame is received from each camera and stored in the storage device 112 before moving to a next camera in the sequence. In this manner, a series of sequential frames is obtained by each camera 102–106 and stored in the storage device 112 for later retrieval.

A drawback to the surveillance system 100 illustrated in FIG. 1 is that because a finite amount of time is required to re-condition the decoder 110 each time the multiplexer 108 selects a video signal from a different one of the cameras 102–106 in the sequence, the speed at which the system 100 can scan from one camera to the next is limited. Because significant unauthorized or criminal activity can occur in a matter of seconds, it is typically desired to complete an entire cycle of all the cameras 102–106 in less than one second. As the number of cameras is increased, however, the time required for the system 100 to perform a complete cycle of all the cameras can become unacceptably long.

To address this problem, a video surveillance system can include multiple video decoders. FIG. 2 illustrates a schematic block diagram of a video surveillance system 200 of the prior art having multiple video decoders 208–212. As shown in FIG. 2, a plurality of (n) video cameras 202, 204 and 206 are positioned at various locations and are each coupled to provide a video signal to respective one of a plurality of (n) video decoders 208, 210 and 212. Each of the video decoders 208–212 receives a video signal from the corresponding one of the cameras 202–206, synchronizes its internal circuits to the video signal, controls gain levels, performs dc restoration on the video signal and places the video signal into a format suitable for storage and display. The outputs of the video decoders 208–212 are coupled to corresponding inputs of a multiplexer 214. An output of the multiplexer 214 is coupled to an input of a storage device 216. An output of the storage device 216 is coupled to a display device 218.

Because each video camera 202–206 corresponds to a dedicated video decoder 208–212, each video decoder 208–212 remains conditioned to the video signals received from the corresponding one of the cameras 202–206. Accordingly, by appropriately controlling the multiplexer 214, the video surveillance system 200 can be rapidly cycled through all the cameras 202–206 such that the storage device 216 receives frames from each camera 202–206 in less time than would be required by the video surveillance system 100 of FIG. 1.

Due to the functions required to be performed by the video decoders 208–212, the video decoders 208–212 tend to have a relatively high cost. Accordingly, the video surveillance system 200 of FIG. 2 having multiple decoders 208–212 tends to be significantly more expensive in comparison to the system 100 of FIG. 1 which has only one decoder 110. Further, as the number of cameras increases, this cost difference also increases.

Therefore, prior video surveillance systems exhibit a trade-off in that increases in performance are accompanied by significant increases in cost. Therefore, what is needed is a technique for increasing the performance of a video surveillance system without significantly increasing its cost.

SUMMARY OF THE INVENTION

A method and apparatus for receiving video signals from a plurality of video cameras, such as in a video surveillance system. The plurality of video cameras are positioned at various locations and are each coupled to provide a video signal to a respective input of a multiplexer. A select input of the multiplexer conditions the multiplexer to route a selected one of the video signals from the cameras to an output of the multiplexer. An output of the multiplexer is coupled to a video decoder. The video decoder receives the selected video signal from the multiplexer and is conditioned according to the video signal. This includes synchronizing the video decoder horizontally and vertically to the video signal, locking to phase and frequency of a chrominance subcarrier of the video signal, controlling a gain level for the video signal and adjusting a dc clamping level for dc restoration of the video signal. Parameters representative of at least one of these quantities, though preferably for all of these quantities, are stored in association with the identity of the corresponding video camera. The video decoder also places each video signal into a format suitable for storage in a storage device and for display by a display device.

The multiplexer is controlled to cycle through the cameras in a sequence. As each camera is selected for providing its video signal to the video decoder, the stored parameters corresponding to the camera are retrieved and utilized to initialize the video decoder for decoding the video signal. A video frame for each camera is stored before selecting a next camera in the sequence.

Therefore, the invention duplicates storage locations for storing parameters corresponding to each camera, rather than requiring multiple video decoders, as in prior systems. As a result of storing parameters corresponding to each camera and utilizing these parameters to initialize the video decoder, the amount of time required by the present invention to condition the video decoder is significantly reduced in comparison to prior systems using a single decoder. Accordingly, the present invention allows a surveillance system to cycle through each of a plurality of cameras in less time than prior systems having a single video decoder, but without the high cost associated with prior systems which employ multiple video decoders.

DETAILED DESCRIPTION OF A PREFERRED EMBODIMENT

Figure 3:
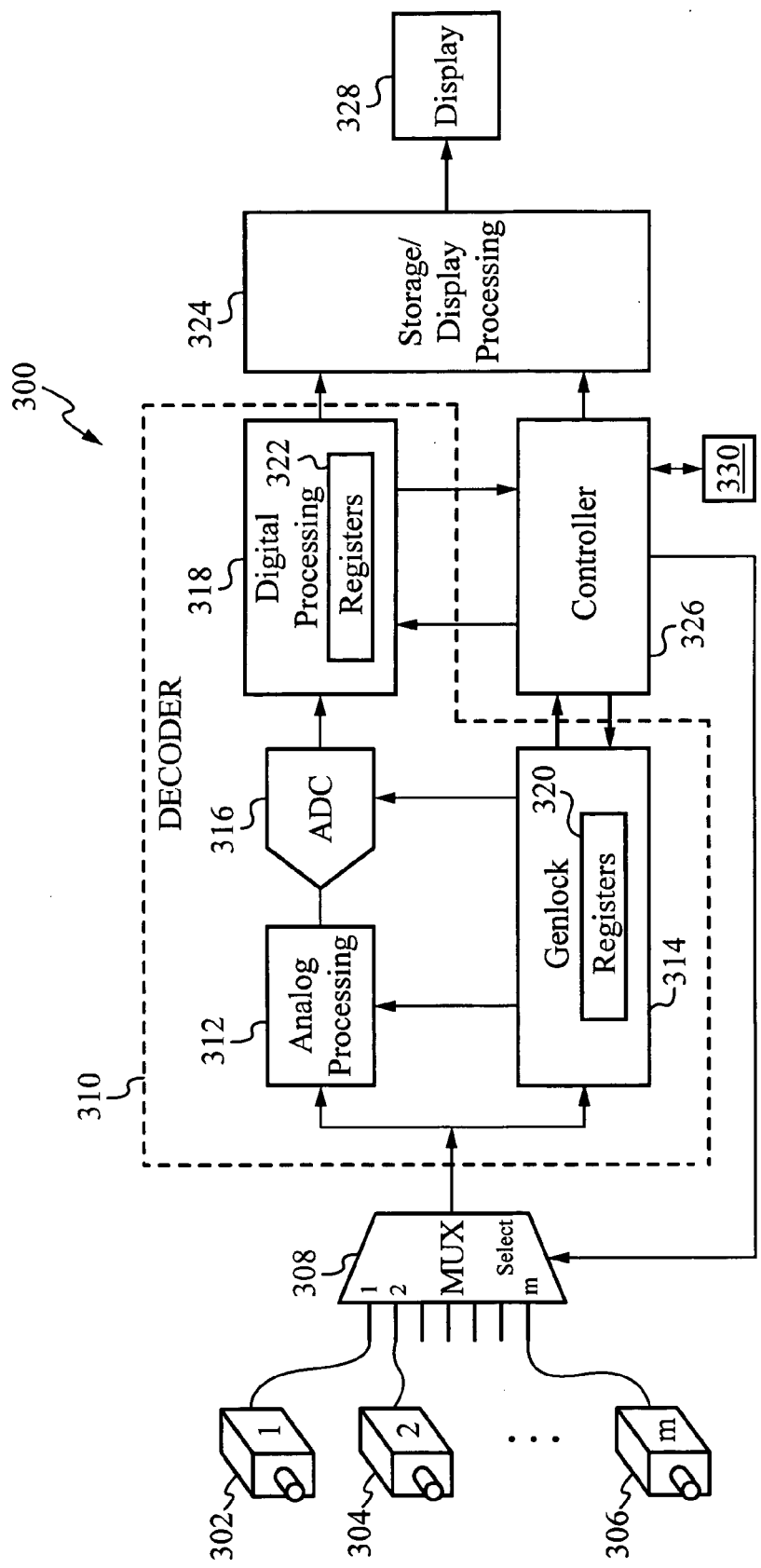
FIG. 3 illustrates a schematic block diagram of a video surveillance system 300 in accordance with a preferred embodiment of the present invention.

FIG. 3 illustrates a schematic block diagram of a video surveillance system 300 in accordance with a preferred embodiment of the present invention. A plurality of (m) video cameras 302, 304 and 306 are positioned at various locations and are each coupled to provide a video signal to a respective input of a multiplexer 308. A select input of the multiplexer 308 conditions the multiplexer 308 to route a selected one of the video signals from the cameras 302–306 to an output of the multiplexer 308. The cameras 302–306 need not be synchronized to each other. Accordingly, video signals formed by the cameras 302–306 can vary from each other in frequency, phase, amplitude and dc offset.

An output of the multiplexer 308 is coupled to a video decoder 310. The video decoder 310 includes an analog processing block 312, a genlock block 314, an analog-to-digital converter (ADC) 316, and a digital processing block 318. The selected video signal from the output of multiplexer 308 is provided to an input of the analog processing block 312 and to an input of the genlock block 314. An output of the analog processing block 312 is coupled to an input of the analog-to-digital converter 316. Outputs of the genlock block 314 are coupled to inputs of each of the analog processing block and the analog-to-digital converter 316. An output of the analog-to-digital converter 316 is coupled to the digital processing block 318.

Although the multiplexer 308 is illustrated in FIG. 3 as a separate element from the decoder 310, it will be apparent that its function as a selector of the video signals can be performed by another circuit element, such as a switch array, and that its function can be incorporated into the decoder 310.

The analog processing block 312 includes analog signal processing elements which precondition a video signal received from the multiplexer 308 into a form suitable for the analog-to-digital converter 316. For example, the analog processing block 312 can include sample-and-hold circuitry and analog filters. The analog-to-digital converter 316 converts a preconditioned analog video signal received from the analog processing block 312 into a series of digital samples.

The genlock block 314 generates timing pulses for the analog processing block 312 and the analog-to-digital converter 316. These timing pulses are synchronous with the incoming video signal and are representative of the horizontal frequency, the horizontal phase, the chrominance frequency and chrominance phase associated with the incoming video signal. The genlock block 314 includes a number of registers 320 for storing parameters which are representative of some or all of these quantities. Thus, the registers 320 preferably store a horizontal frequency parameter, a horizontal phase parameter, a chrominance frequency parameter and a chrominance phase parameter. These parameters are particular to the camera 302, 304 or 306 which is currently supplying the video signal to the decoder 310.

The digital processing block 318 receives the series of digital samples from the analog-to-digital converter 316 and converts these samples into a form suitable for storage and display. For example, the digital processing block 318 can convert NTSC digital video samples into luminance-chrominance (Y-C) samples, compressed Y-C samples, or into red-green-blue (RGB) component video samples, as appropriate. Preferably, the digital processing block 320 performs automatic gain control (AGC), automatic color control (ACC) and dc restoration. The digital processing block 318 includes a number of registers 322 for storing parameters which are representative of some or all of these quantities. Thus, the registers 322 preferably store an AGC gain parameter, an ACC gain parameter, and a clamp level parameter. The clamp level parameter is for performing dc restoration on the digital samples. These parameters are particular to the camera 302, 304 or 306 which is currently supplying the video signal to the decoder 310.

A storage and display processing block 324 receives digital samples from the digital processing block 318 and stores the samples according to video frames.

Note that for black and white video images, the chrominance component signal is not utilized. In which case, the video decoder 310 is conditioned according to the phase and frequency of the luminance component signal and appropriately controls the gain and dc restoration of the luminance component signal.

A controller block 326 is coupled to the select input of the multiplexer 308 for selecting one of the video signals from the cameras 302–306 to be provided to the decoder 310. In addition, the controller 326 is coupled to the genlock block 314 and to the digital signal processing block 318 for conditioning the genlock block 314 and digital signal processing block 318. For example, the controller 326 selects an appropriate format for the incoming video, such as NTSC and PAL, places the genlock block 320 and the digital signal processing block 318 in run, standby and off modes and performs write and read operations to and from the registers 320, 322, memory 330 and storage and display processing block 324. The controller 326 controls the storage and display of video frames by the storage and display processing block 324. For example, the controller 326 indicates to the storage and display processing block 324 when the start of a frame to be stored occurs and when its end occurs.

Figure 4:
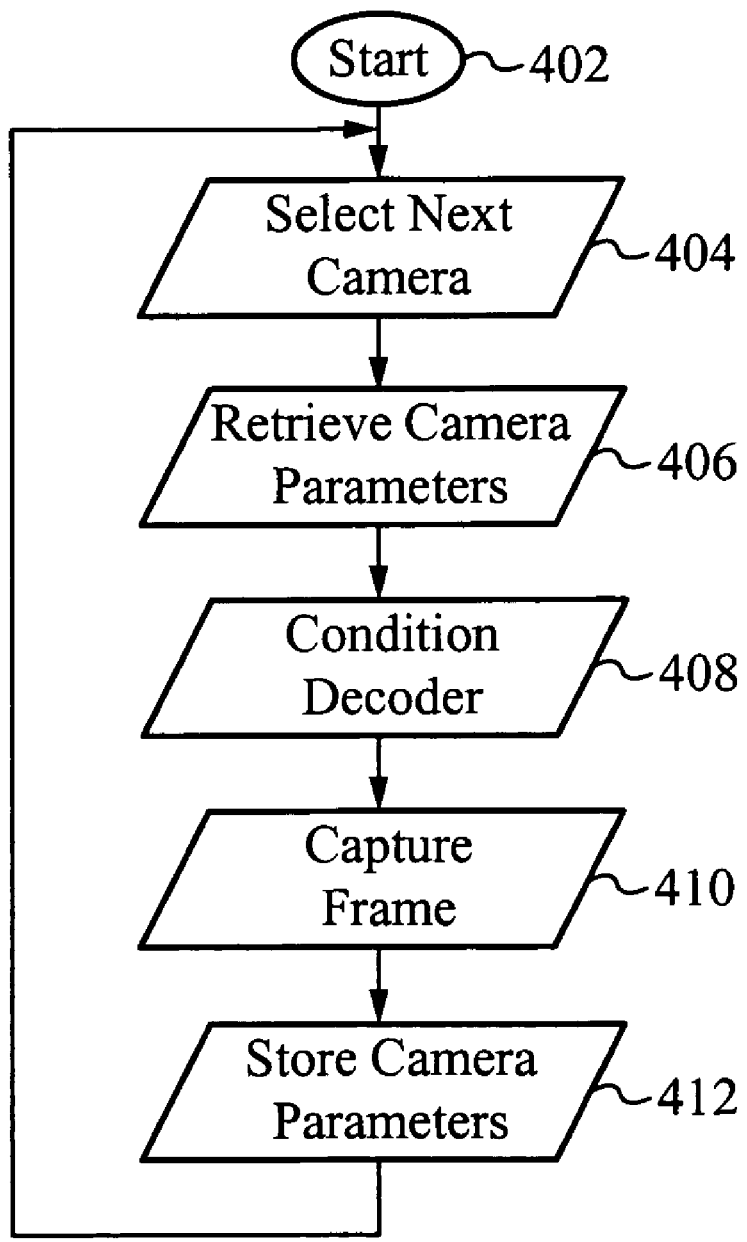
FIG. 4 illustrates a flowchart in accordance with the present invention for capturing video frames from the cameras illustrated in FIG. 3.

FIG. 4 illustrates a flowchart in accordance with the present invention for capturing video frames from the cameras 302–306 illustrated in FIG. 3. The flowchart illustrated in FIG. 4 controls operation of the video surveillance system 300 illustrated in FIG. 3. Thus, referring to FIGS. 3–4, program flow begins in a start state 402. From the start state 402, program flow moves to a state 404. In the state 404, the controller 326 conditions the multiplexer 308 to select a next one of the cameras 302–306 for supplying a video signal to the decoder 310.

Then, program flow moves from the state 404 to a state 406. In the state 406, the controller 326 loads parameters into registers 320 and 322 which are particular to the camera selected in the state 404. These parameters were previously obtained and stored by the controller 326 in association with an identification of the camera or in storage locations which are associated with the corresponding camera. Thus, the controller 326 maintains a set of parameters for each of the cameras 302–306. These parameters can be stored in the storage and display processing block 324 or in the memory 330. A significant aspect of the present invention is that these parameters serve as initial conditions for conditioning the decoder 310 according to the selected one of the video signals.

In the preferred embodiment, the parameters supplied to the decoder 310 include, horizontal frequency, horizontal phase, chrominance frequency, chrominance phase, AGC gain, ACC gain and dc clamping level. It will be apparent, however, that the principle advantages of the present invention can be achieved by supplying less than all of these parameters to the decoder 310. For example, because a significant amount of time is required for a conventional video decoder to obtain the horizontal frequency of a video signal, an embodiment of the present invention may supply only the horizontal frequency parameter to the decoder 310.

From the state 406, program flow moves to a state 408. In the state 408, the decoder 310 becomes conditioned according to the video signal being received. Because the parameters loaded in the state 406 were previously obtained for the currently selected camera and because these parameters change slowly over time and serve as initial conditions for the state 408, the conditioning of the decoder 310 which occurs in the state 408 takes significantly less time than if no initial conditions were supplied. During the state 408, the parameters stored in the registers 320 and 322 are updated to reflect any changes that have occurred in the video signal formed by the currently selected camera since the previous time the parameters were stored.

From the state 408, program flow moves to a state 410. In the state 410, a video frame representative of an image received by the currently selected one of the cameras 302–306 is captured and stored by the storage and display processing block 324. In the preferred embodiment, the stored video frame is received contiguously from top-to-bottom. Accordingly, storage of the video frame does not begin until the start of the frame occurs. Alternately, however, the stored video frame is a bottom portion of a first frame and a top portion of a next frame. Post-processing can be utilized to correct any discontinuities in the image caused by moving objects. An advantage of this technique of storing portions of two frames is that storage can begin immediately upon completion of the state 408 without having to wait for the start of frame to occur.

Then, program flow moves to a state 412. In the state 412, the updated parameters stored in the registers 320 and 322 are provided to the controller 326 which then maintains the parameters in association with the identification of the currently selected one of the cameras 302–306 until a next time the multiplexer 308 is conditioned to select the video signal from the corresponding camera. As mentioned, these parameters can be stored in the storage and display processing block 324 or in the memory 330.

From the state 412, program flow returns to the state 404 where a next one of the cameras 302–306 is selected by the controller 326. The states illustrated in FIG. 4 are repeated for each of the m cameras 302–306. A complete cycle includes performance of the steps 404–412 for each of the cameras 302–306. Though the video surveillance system 300 can switch from camera-to-camera in a predetermined order, it is not necessary. For example, the next camera can be selected in the state 404 at random or in response to operator input.

An optional enhancement to the present invention includes observing changes in the value of a parameter, such as horizontal frequency, horizontal phase, chroma frequency, chroma phase, AGC gain, ACC gain or dc clamping level, and, then, utilizing the changes to predict future changes in the parameter. For example, referring to FIGS. 3–4, assume that a value for the chrominance phase for a particular one of the cameras 302–306 increases over time. In which case, in the state 408, the video decoder 314 increases the value for this parameter, as needed. This increase can be observed by calculating a difference between the chrominance phase parameter in state 406, which is a prior value obtained from the particular one of the cameras 302–306, and in the state 410, which is a current value obtained for the camera. It is likely that in a next cycle, this parameter will have changed again by an approximately corresponding amount. Accordingly, the calculated difference can be added to the chrominance phase parameter obtained in the state 410 prior to storing the value for the next cycle. Alternately, the calculated difference can be added to the chrominance phase parameter in the state 406 upon retrieving the value for a prior cycle. Accordingly, this aspect of the present invention attempts to predict future changes in the parameters based upon past changes to further reduce the time required in the state 408 for the video decoder to become conditioned according to the video signal received from each of the cameras 302–306.

An aspect of the present invention takes into account the need to obtain values for each of the parameters, such as horizontal frequency, horizontal phase, chroma frequency, chroma phase, AGC gain, ACC gain and dc clamping level, upon start-up of the video surveillance system 300. Referring to FIGS. 3–4, because values for these parameters have not yet been obtained, additional time is required in the state 408 for each of the cameras 302–306 before the video decoder 310 becomes appropriately conditioned to the video signal in comparison to the time required once the system 300 is up and running. In a first embodiment, this is accomplished during a first cycle through all the cameras 302–306 by allotting extra time in the state 408 to allow the video decoder 310 to become conditioned according to the video signal received from each camera 302–306. For each camera 302–306, the parameters are stored in the state 410. Then, because these stored parameters are utilized to initialize the video decoder 310 in a subsequent cycle, time allotted in the state 408 for each camera 302–306 can be reduced. Thus, upon completion of this first cycle, a video frame is captured in the state 410 from each of the cameras 302–306.

In an alternate embodiment, the time required for the video decoder 310 to become conditioned according to each video signal is accumulated over two or more cycles through all of the cameras 302–306. Accordingly, upon start-up of the video surveillance system 300, the time allotted for each video signal in the state 408 during a first cycle through all of the cameras 302–306 is limited such that the video decoder 310 is only partially conditioned upon completion of the first cycle. In a second or subsequent cycle, conditioning of the video decoder 310 for each video signal is completed. Obtaining a video frame in the state 410 is not accomplished until the second or subsequent cycle. Thus, according to this embodiment of the present invention, two or more cycles are required to capture a video frame from each of the cameras 302–306.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of receiving video signals from a plurality of video cameras wherein the method comprises steps of:
   a. selecting one of the plurality of video cameras for providing a video signal to a video decoder;
   b. retrieving a parameter representative of the video signal from a memory store; and
   c. conditioning the video decoder according to the parameter; and
   d. updating the parameter according to the video signal thereby forming an updated parameter and a predicted value for the parameter,
   wherein forming the predicted value for the parameter includes calculating a difference between prior value obtained for the parameter and a current value obtained for the parameter and combining the difference with the current value.

2. The method according to claim 1 further comprising a step of capturing a video frame from the selected one of the plurality of video cameras.

3. The method according to claim 2 further comprising a step of storing the captured video frame.

4. The method according to claim 2 further comprising a step of completing a cycle wherein the step of completing the cycle comprises performing the steps of selecting, retrieving, conditioning and capturing for each camera of the plurality.

5. The method according to claim 1 further comprising a step of storing the updated parameter in association with an identification of the selected one of the plurality of video cameras.

6. The method according to claim 5 further comprising a step of selecting a next one of the plurality of cameras according to a sequence.

7. The method according to claim 1 further comprising a step of storing the updated parameter in a storage location which is associated with the corresponding camera.

8. The method according to claim 7 further comprising a step of selecting a next one of the plurality of cameras according to a sequence.

9. The method according to claim 1 further comprising a step of initializing the apparatus upon start-up by obtaining an initial value for the parameter corresponding to each video signal during a first cycle through all of the cameras wherein a video frame is captured from each camera during the first cycle.

10. The method according to claim 1 further comprising a step of initializing the apparatus upon start-up by performing two or more cycles through all of the cameras and wherein a video frame is captured from each camera only upon completion of the two or more cycles.

11. The method according to claim 1 wherein the parameter is a horizontal frequency of the video signal.

12. The method according to claim 11 wherein the parameter is a horizontal phase of the video signal.

13. The method according to claim 12 wherein the parameter is a chrominance frequency of the video signal.

14. The method according to claim 13 wherein the parameter is a chrominance phase of the video signal.

15. The method according to claim 1 wherein the parameter is a gain level for the video signal.

16. The method according to claim 15 wherein the parameter is a dc clamping level for the video signal.

* * * * *

UNITED STATES PATENT AND TRADEMARK OFFICE
CERTIFICATE OF CORRECTION

PATENT NO.         : 7,065,140 B1                              Page 1 of 1
APPLICATION NO.    : 09/414307
DATED              : June 20, 2006
INVENTOR(S)        : David W. Ritter and Ara Bicakci It is certified that error appears in the above-identified patent and that said Letters Patent is hereby corrected as shown below:

IN THE DRAWINGS
Please delete fig 1 and replace with fig 1 below.

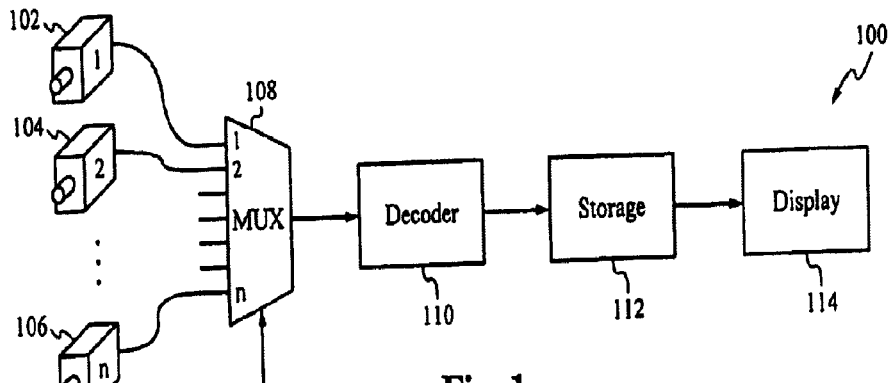

Figure 1:
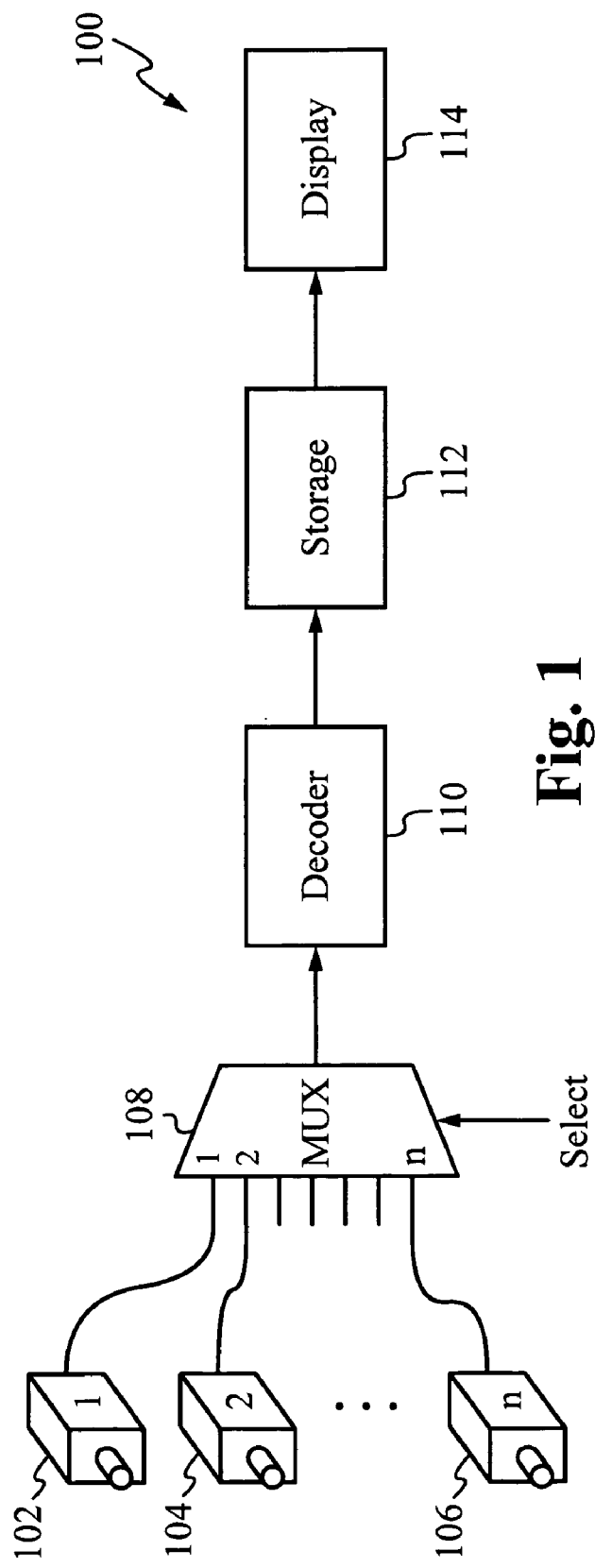
FIG. 1 illustrates a schematic block diagram of a video surveillance system 100 of the prior art.
Figure 2:
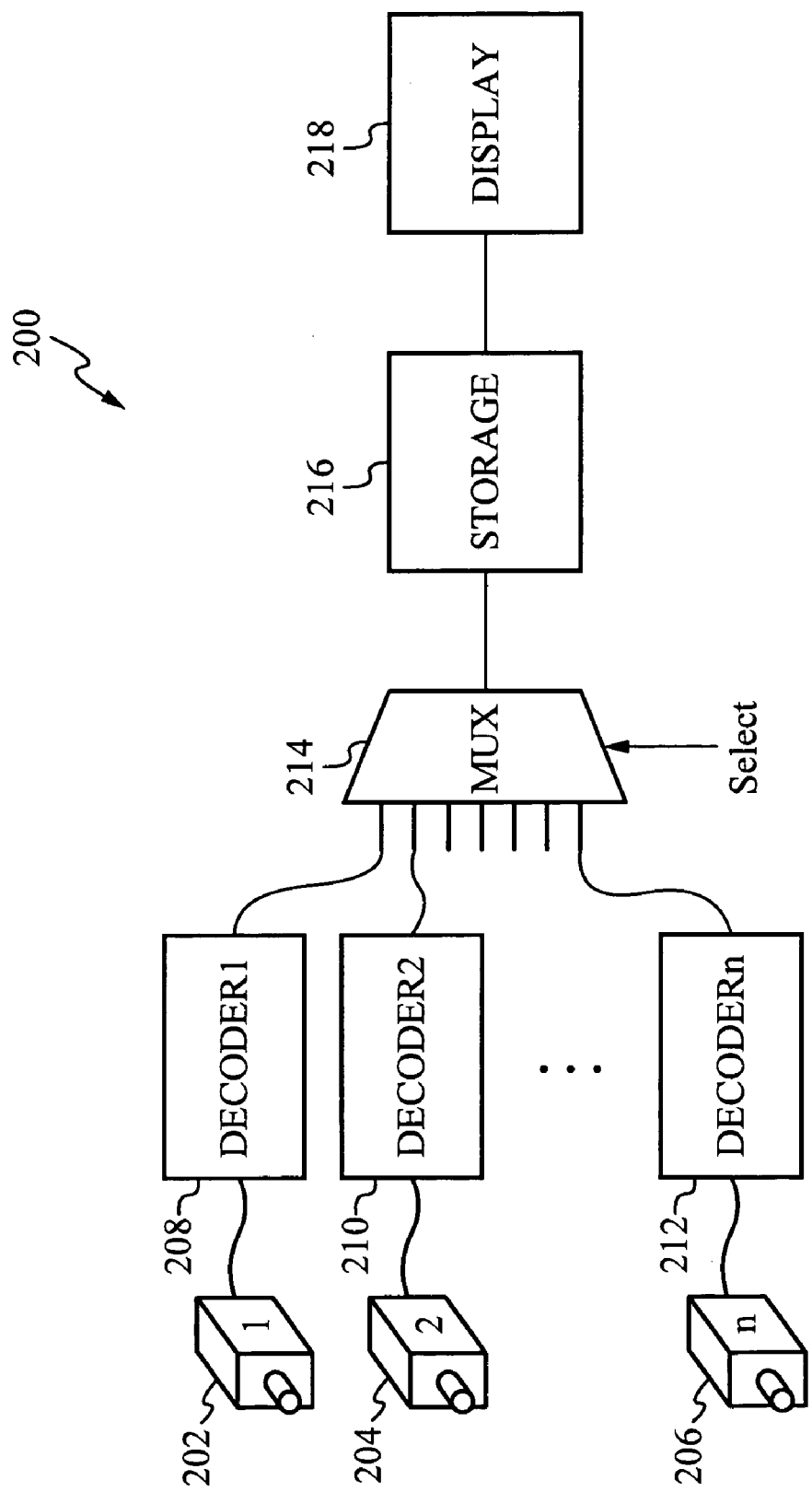
FIG. 2 illustrates a schematic block diagram of a video surveillance system 200 of the prior art having multiple video decoders.

Fig. 1
(PRIOR ART)

Signed and Sealed this

Twenty-ninth Day of April, 2008

JON W. DUDAS
*Director of the United States Patent and Trademark Office*